Figure 1:
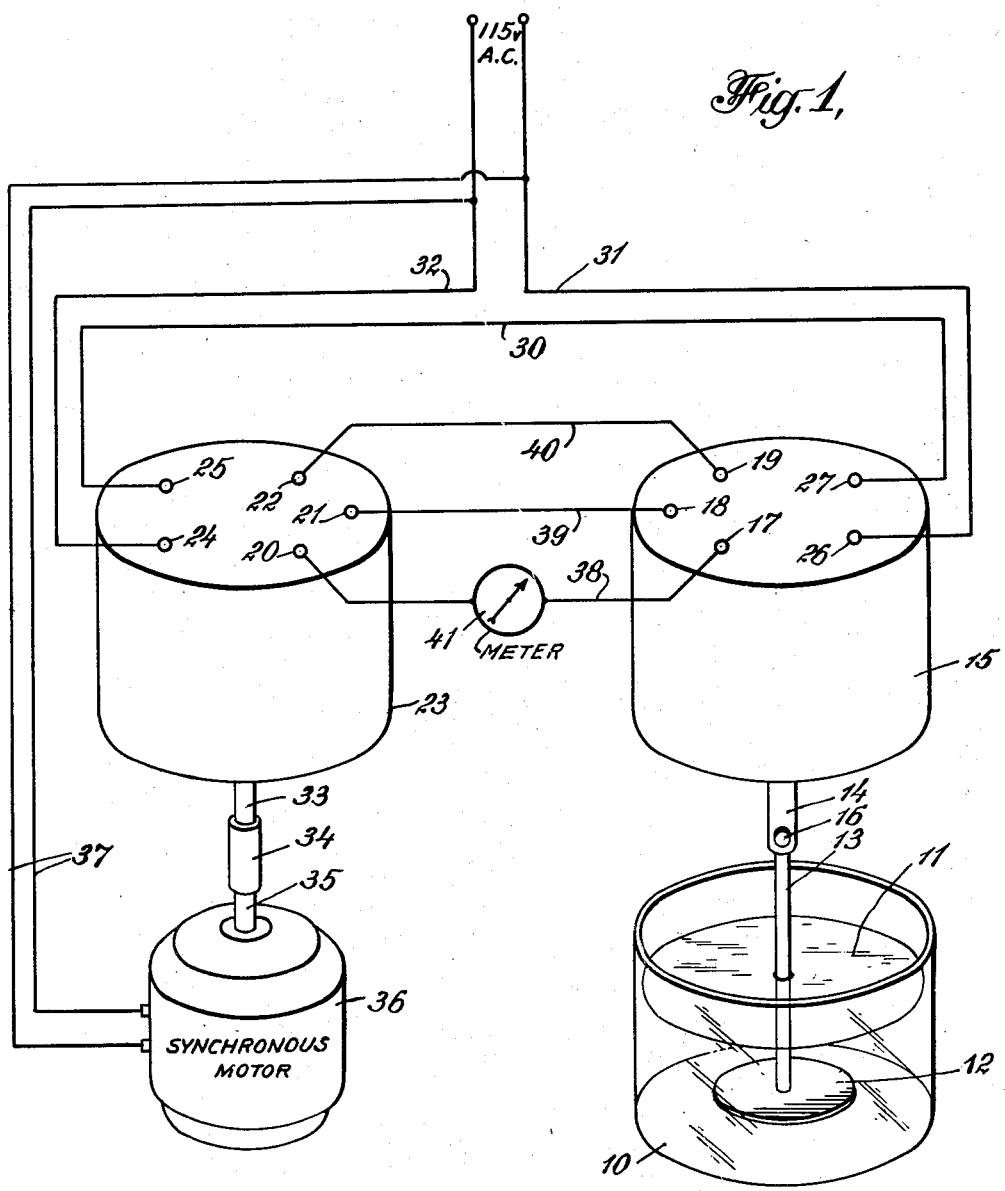

Oct. 18, 1949.　　　　　P. B. WEISZ　　　　　2,485,424
VISCOSIMETER

Filed July 2, 1947　　　　　　　　　　　　　　2 Sheets-Sheet 1

INVENTOR
PAUL B. WEISZ
BY
ATTORNEY

Oct. 18, 1949.  P. B. WEISZ  2,485,424
VISCOSIMETER

Filed July 2, 1947  2 Sheets-Sheet 2

INVENTOR
PAUL B. WEISZ
BY
ATTORNEY

UNITED STATES PATENT OFFICE 2,485,424

VISCOSIMETER

Paul B. Weisz, Swarthmore, Pa., assignor to Socony-Vacuum Oil Company, Incorporated, a corporation of New York Application July 2, 1947, Serial No. 758,680

4 Claims. (Cl. 73—59)

This invention relates generally to measuring instruments and more particularly to direct-reading viscosimeters.

The usual methods for measuring the viscosity of liquids involve liquid flow measurements which are made with a stop-watch or other suitable timer operated by an individual. Some of these methods are those which involve the determination of the rate of flow of a liquid in a capillary, over a weir, through an orifice, or measuring the rate of fall of an object in the liquid. Since the degree of transparency of liquids varies the factors involved in making such measurements are obvious.

Viscosimeters have been constructed which take advantage of the effect of frictional force offered by a liquid to an object rotating therein. This force is usually determined mechanically by a restoring spring. Such instruments, although they have achieved a degree of success, are not adapted to general laboratory use.

It would seem logical to place a rotating object in a liquid and measure the frictional energy offered to it by the liquid by measuring the electrical energy supplied to the driving motor and which is due to friction in the viscous liquid but a study of a variety of motors shows that the no-load current required to drive such motors is very large compared to the additional current drawn due to the frictional loading by a liquid of practical viscosity. Undertaking a measurement of viscosity by this method would be comparable to attempting to measure the weight of a mass of a few grams by combining it with a mass having, for example, a weight of one ton, weighing it, then removing the small mass from the larger one, and again weighing the larger mass and subtracting the two weights.

The present invention provides a method and apparatus for measuring the viscosity of liquids which is related to the last above recited method in that a rotating object is placed in the liquid and electrical energy which is a function of and is due to friction in the viscous liquid is measured. This is made possible by driving the rotating object through the medium of a Selsyn-motor system. It was found that the Selsyn-motor, which was developed mainly for the purpose of transmitting a low torque mechanical motion such as a dial indication, could be continuously rotated with a current input which is negligible compared to the current input due to the slight loading of the driven rotating object by the viscous force of the liquid. It was found that if a pair of matched Selsyn units were connected together by interconnecting equivalent rotor terminals and energizing both primaries of the Selsyn units from the same line voltage source that the rotors will line themselves up to be in phase with the electromagnetic field produced in each unit. By connecting the rotating object that is to be disposed in the liquid whose viscosity is to be determined to the rotor of one unit and driving the rotor of the other unit at a constant speed by a synchronous motor, the rotor connected to the rotating object will be driven synchronously. If no viscous drag is experienced by the rotating object the current flowing in one of the interconnecting rotor lines will be negligibly small, for example .02 milliampere. Therefore, with a milliammeter, having a suitable calibration, connected in one of the interconnecting rotor terminal lines the current flowing in that line due to the loading of the rotating object can be measured. Any loading of the rotating object will produce a current, that will be indicated by the milliammeter, which is due to a phase unbalance between the two Selsyn units and which is substantially proportional to the viscosity of the liquid. For example, if the rotating object is a relatively thin aluminum disc having a diameter of approximately 1.625'' and is driven at a speed of 376 revolutions per minute, a liquid having a viscosity of 200 centistokes will give a reading of approximately 0.5 milliampere on a 0–1.0 milliampere scale and the full scale deflection will correspond to a viscosity of 500 centistokes. Since the variation in current with viscosity is substantially a straight line, the meter can be calibrated to read directly viscosity in centistokes.

Therefore a primary object of the present invention is to provide a practical method and apparatus for determining the viscosity of fluids by measuring a parameter that is a function of the frictional force offered by the fluid to a rotating object disposed therein.

A further object of the present invention resides in the provision of apparatus for measuring the viscosity of fluids which utilizes a Selsyn system for driving a rotating object in the fluid.

Still another object of the present invention resides in a method of determining the viscosity of fluid by utilizing a Selsyn system for driving a rotating object which is disposed in the fluid and measuring the current in one of the interconnecting rotor lines which varies substantially directly with the phase unbalance between the two units of the Selsyn system.

Figure 2:
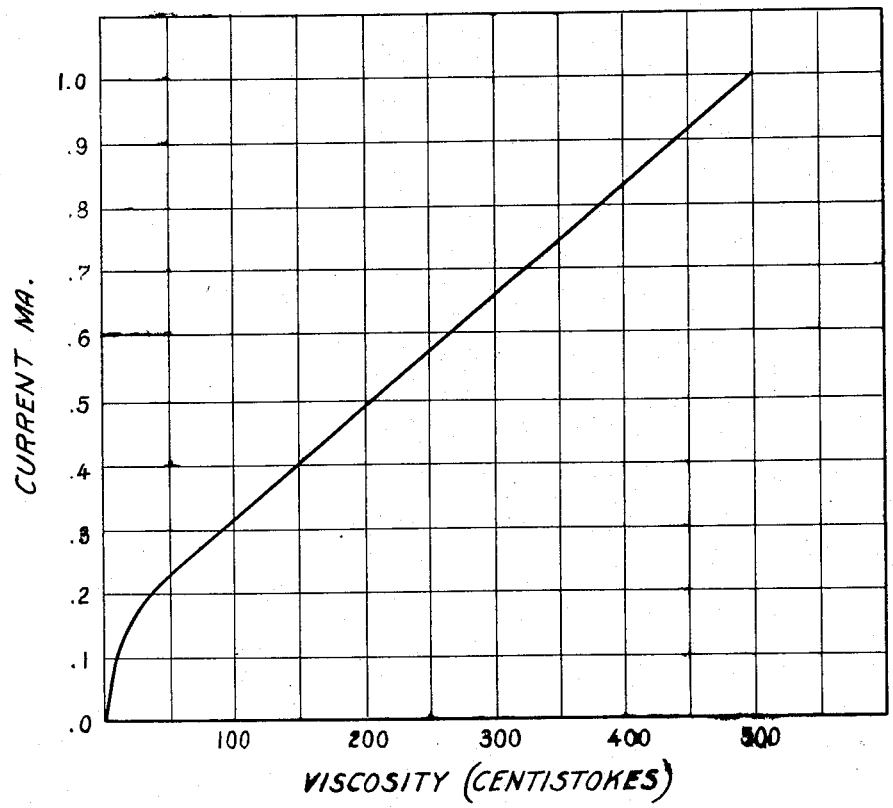

Other objects and advantages of the present invention will become apparent from the following detailed description when considered with the drawings, in which Figure 1 is a schematic view of one form of the apparatus and its associated electrical system which may be utilized in carrying out the method of the present invention; and Figure 2 is a curve which has been plotted with viscosity in centistokes as abscissa and current in milliamperes as ordinates.

Referring to the drawings in detail, particularly Figure 1, there is shown a container 10 having a fluid 11 therein whose viscosity it is desired to determine. Disposed in the fluid 11 is a disc 12 which is connected to or made integral with a shaft 13 and adapted to rotate therewith. Shaft 13 is detachably connected to the rotor shaft 14 of a Selsyn unit 15 by means of a suitable connecting element such as a set screw 16. The rotor terminals 17, 18 and 19 of the Selsyn unit 15 are respectively connected to rotor terminals 20, 21 and 22 of a second Selsyn unit 23. The primary windings of the Selsyn units 15 and 23 have their respective terminals 24 and 25 and 26 and 27 connected in series and to the same alternating current power supply by means of conductors 30, 31 and 32. The rotor of Selsyn unit 23 has its shaft 33 connected by a suitable coupling 34 to the rotor shaft 35 of a synchronous motor 36. Synchronous motor 36 is supplied with electrical power from a conventional alternating current power source not shown by means of conductors 37.

In operation the synchronous motor 36 is driven at a constant speed by electrical power supplied from the conductors 37. Motor 36 drives the rotor of the Selsyn unit 23. This, due to the characteristics of Selsyn systems described above, tends to produce an in-phase rotation of the rotor of Selsyn unit 15, which in turn drives the shaft 13 to rotate the disc 12 in the fluid whose viscosity it is desired to determine. As pointed out above, when the disc 12 experiences no loading due to the viscosity of the fluid, the current flowing in the connecting lines 38, 39 and 40 of the rotor terminals of the two units is negligibly small. However, when the disc 12 experiences resistance to its rotation in the liquid 11 a measurable current which is substantially proportional to the amount of resistance offered to the rotation of disc 12 will flow in the lines connecting the rotor terminals. Therefore a meter such as the milliammeter 41 connected in one of the lines, for example line 38, will indicate the amount of current flowing in that line. Since the current flowing in line 38 is substantially proportional to the resistance offered by the liquid 11 to the rotation of disc 12 therein, the meter can be calibrated to read centistokes viscosity directly.

The relation between the current flow in line 38 and the viscosity of the liquid undergoing test is illustrated by a specific example in Figure 2. Reference to Figure 2 will show that the curve representing this relationship is a straight line for a wide range of values of viscosity falling off at very low viscosities. From the above teaching it becomes obvious that by changing the dimensions of the disc 12 while keeping the shaft 13 uniform in diameter, the centistoke scale of the meter can be extended in either direction to cover all practical values of viscosity.

Although a milliammeter is used in the preferred form of this invention it is to be understood that a wattmeter can be connected to two or even all three of the rotor lines and a measurement of power made which would be a function of the viscosity of the fluid under test.

Another parameter which can be measured which is a function of the viscosity of the liquid under test is the phase angle of the current versus one of the rotor or stator voltages. This phase angle is a function of the resistive load.

It is to be understood that when accurate values of viscosity are to be determined the temperature of the fluid 11 must be maintained constant at a predetermined value. This can be accomplished by numerous prior art methods such, for example, as disposing the container in a constant temperature bath, not shown in the drawings.

The present invention affords a method and apparatus whereby viscosity variations due to small temperature variations induced by simple heating arrangements can be observed in a period of time that is less than one minute if desired and the quantity of the sample of fluid need not be more than 100 cubic centimeters.

Additionally by using a long cable which carries the conductors leading to the Selsyn unit 15 this unit is made portable and can be used as a hand-unit the rotating element of which can be dipped into a barrel, tank car, or other container of oil or liquid for the purpose of making "on the spot" viscosity checks of bulk material.

I claim:

1. A direct-reading viscosimeter comprising in combination an element adapted to be disposed in a fluid whose viscosity is to be determined, a Selsyn-motor system for rotating said element, means for supplying electrical power to said Selsyn-motor system, synchronous means for driving the rotor of one of the units of the Selsyn-motor system to effect a rotation of the rotor of the other unit of said Selsyn-motor system, means for connecting said last recited rotor to said element, and means for measuring the current flowing in at least one of the lines connecting rotor terminals of the two Selsyn units when said element is rotated in the fluid whose viscosity it is desired to determine.

2. A direct-reading viscosimeter comprising in combination an element adapted to be disposed in a fluid whose viscosity is to be determined, a Selsyn-motor system for rotating said element, means for supplying electrical power to said Selsyn-motor system, synchronous means for driving the rotor of one of the units of the Selsyn-motor system to effect a rotation of the rotor of the other unit for said Selsyn-motor system, means for connecting said last recited rotor to said element, and means for measuring the power in the lines connecting like rotor terminals of the Selsyn units when said element is rotated in the fluid whose viscosity it is desired to determine.

3. A direct-reading viscosimeter comprising in combination an element adapted to be disposed in a fluid whose viscosity is to be determined, a Selsyn-motor system for rotating said element, means for supplying electrical power to said Selsyn-motor system, synchronous means for driving the rotor of one of the units of the Selsyn-motor system to effect a rotation of the rotor of the other unit of said Selsyn-motor system, means for connecting said last recited rotor to said element, and means for measuring the current flowing in one of the lines connecting like rotor terminals of the Selsyn units which is due to phase unbalance between the two Selsyn units when said element is rotated in the fluid whose viscosity it is desired to measure.

4. A direct-reading viscosimeter comprising in combination an element adapted to be disposed in a fluid whose viscosity it is desired to determine, a Selsyn-motor system for rotating said element, means for interconnecting equivalent rotor terminals of the units of said Selsyn-motor system, a source of electrical power, means for conducting power from said power source to the primaries of each unit of the Selsyn system, synchronous means for driving the rotor of one of the units of the Selsyn-motor system to effect rotation of the rotor of the other unit of said Selsyn-motor system, means for connecting said last recited rotor to said element, and means for measuring the current flowing in at least one of the rotor terminal interconnecting means due to a phase unbalance between the two Selsyn units when said element is rotated in a fluid whose viscosity it is desired to determine.

PAUL B. WEISZ.

REFERENCES CITED

The following references are of record in the file of this patent:

UNITED STATES PATENTS

| Number | Name | Date |
| --- | --- | --- |
| 1,449,458 | Sutermeister | Mar. 27, 1923 |
| 1,942,920 | Fawkes | Jan. 9, 1934 |
| 2,280,947 | Gulliksen | Apr. 28, 1942 |
| 2,357,003 | Hurndall | Aug. 29, 1944 |